United States Patent
Torigoe et al.

(10) Patent No.: US 8,625,164 B2
(45) Date of Patent: Jan. 7, 2014

(54) IMAGE FORMING APPARATUS AND METHOD, COMPUTER PROGRAM, AND RECORDING MEDIUM USING DENSITY SIGNAL AND LOOK-UP TABLE

(75) Inventors: Makoto Torigoe, Tokyo (JP); Takashi Nakamura, Yokohama (JP); Akihiko Nakatani, Kawasaki (JP); Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1489 days.

(21) Appl. No.: 11/845,475

(22) Filed: Aug. 27, 2007

(65) Prior Publication Data

US 2008/0055351 A1    Mar. 6, 2008

(30) Foreign Application Priority Data

Aug. 30, 2006  (JP) .................................. 2006-233776

(51) Int. Cl.
*G06K 15/00* (2006.01)
*H04N 1/40* (2006.01)
*H04N 1/405* (2006.01)

(52) U.S. Cl.
USPC ......................................... 358/3.23; 358/3.1

(58) Field of Classification Search
USPC ....................................................... 358/1.13
See application file for complete search history.

(56) References Cited

U.S. PATENT DOCUMENTS

| 2003/0086102 A1* | 5/2003 | Soler et al. ...................... 358/1.9 |
| 2005/0168495 A1 | 8/2005 | Nakatani et al. |
| 2006/0061785 A1 | 3/2006 | Nagoshi et al. |
| 2006/0221358 A1* | 10/2006 | Takahashi ...................... 358/1.1 |
| 2007/0024647 A1* | 2/2007 | Cowan et al. ..................... 347/5 |

FOREIGN PATENT DOCUMENTS

| CN | 1657297 A | 8/2005 |
| CN | 1749014 A | 3/2006 |
| JP | 2000-013620 A | 1/2000 |
| JP | 2005-064841 A | 3/2005 |
| JP | 2005-217985 A | 8/2005 |

* cited by examiner

*Primary Examiner* — Douglas Tran

(74) *Attorney, Agent, or Firm* — Canon U.S.A., Inc. IP Division

(57) ABSTRACT

In a recording medium selecting step, a recording medium on which an image is to be formed is selected from among a plurality of recording media having unique color tones. In a mode setting step, it is determined whether the image is to be output in a monochrome mode. In a signal converting step, a luminance signal corresponding to the image is converted into a density signal when the monochrome mode is set in the mode setting step. In a forming step, an image is formed on the recording medium selected in the recording medium selecting step according to the density signal. The signal converting step is controlled so that a color tone of an intermediate-density portion of the image formed on the recording medium is set to be near $a^* = A$ in the $a^*b^*$ plane of the CIE-$L^*a^*b^*$ space, where A is a constant.

21 Claims, 7 Drawing Sheets

PAPER WHITE VS GRAY TONE

|  | PAPER WHITE | | CENTER GRAY TONE | |
| --- | --- | --- | --- | --- |
|  | a* | b* | a* | b* |
| RECORDING MEDIUM M0 (REFERENCE) | 0.0 | −4.5 | 0.5 | −1.5 |
| RECORDING MEDIUM M1 | 0.7 | −2.5 | 0.5 | −0.9 |
| RECORDING MEDIUM M2 | 0.5 | −0.6 | 0.5 | −0.3 |
| RECORDING MEDIUM M3 | −0.3 | −4.1 | 0.5 | −1.4 |
| RECORDING MEDIUM M4 | 0.9 | −0.6 | 0.5 | −0.3 |

IMAGE FORMING APPARATUS AND METHOD, COMPUTER PROGRAM, AND RECORDING MEDIUM USING DENSITY SIGNAL AND LOOK-UP TABLE

BACKGROUND OF THE INVENTION

1. Field of the Invention

The present invention relates to an image forming apparatus and method, a computer program, and a recording medium, and more specifically to, for example, image processing for adjusting the color tone of monochrome images.

2. Description of the Related Art

Recording apparatuses capable of outputting color images include an inkjet recording apparatus having a plurality of color inks. In an apparatus forming an image by subtractive color mixing, such as an inkjet recording apparatus, three colors of cyan (hereinafter referred to as "C"), magenta (hereinafter referred to as "M"), and yellow (hereinafter referred to as "Y") are generally used as primary colors. Such a color arrangement allows representation of C, M, and Y hues and also representation of, for example, red (hereinafter referred to as "R") by superposition of M and Y. Further, the ratio of ink colors to be superimposed is adjusted stepwise to express substantially all color spaces. Recently, the inkjet recording technology based on this principle has increasingly been developed, and there is no surprise that the quality of color images comparable to that of silver-halide photographs can be achieved.

In recent inkjet recording apparatuses, as well as an increase in the quality of color images, technical extension to the field of monochrome photography has progressed.

Monochrome photographs are more popular than color photographs particularly for professional or high-end users who pursue artistically high-quality photography. Inkjet printer recording apparatuses capable of providing monochrome images have started to be commercially available.

One of the important characteristics of monochrome photography is the color tone. Monochrome photographs with good color tones are demanded by users, and inventions relating to such monochrome photographs have been proposed (see, for example, Japanese Patent Laid-Open No. 2005-217985). Japanese Patent Laid-Open No. 2005-217985 discloses that a color conversion is performed so that the color of a monochrome image formed on a recording medium can be located, in the a*b* plane of the CIE-L*a*b* space, on one of three sides of or within a triangle defined by three points of (a*, b*)=(0, −3), (a*, b*)=(1, 0), and (a*, b*)=(3, 0). Therefore, high-quality gray-tone representation can be achieved.

Users who pursue artistically high-quality photography not limited to monochrome photography also have a strong desire to output images on various recording media such as glossy paper typically used as photographic output media, paper with low-gloss silky texture, called "semi-gloss" paper, and non-gloss, i.e., matte-finished, paper. Recently, recording media with unique texture particularly suitable for artistic photography and graphic art, called fine-art paper, have become widespread. There are various types of fine-art paper in terms of the surface treatment, e.g., pearl-finishing, the surface pattern, e.g., embossed pattern, the thickness, etc. Users are able to preferentially select a desired glossy surface or texture. The color tone of an unprinted recording medium called "paper white" may also contribute to such variations of gloss or textures.

The adjustment of color tone in an image with respect to recording media having different color tones of paper white has been attempted many times to date, and inventions relating to adjustment techniques have been proposed (see, for example, Japanese Patent Laid-Open Nos. 2000-13620 and 2005-64841). Japanese Patent Laid-Open No. 2000-13620 discloses that in color matching of recording media having different color tones of paper white, the amount of displacement of a color near paper white is reduced according to the deviation from paper white. Japanese Patent Laid-Open No. 2005-64841 discloses that when paper white is different from reference white, an adjustment coefficient obtained by dividing the XYZ values of reference white by the XYZ values of paper white is used to create a color profile.

If both desires for outputting a recorded monochrome photograph with good color tones and for outputting a monochrome photograph on various recording media having different color tones of paper white are satisfied, the following problem arises.

That is, when a monochrome photograph is output on different recording media, even if the color tone of intermediate levels is matched using a calorimeter, due to the influence of the color tones of paper white of the individual recording media, a color may be viewed differently, thus giving a visually unnatural impression. If a color tone is changed in accordance with paper white, on the other hand, the color tone may not be viewed identically on recording media having different color tones of paper white.

Japanese Patent Laid-Open No. 2005-217985 discloses a system relating to the adjustment of color tone so that a monochrome image with good color tones can be produced on a specific recording medium, but not relating to the adjustment of color tone of a monochrome image between a plurality of recording media having different color tones of paper white. Japanese Patent Laid-Open Nos. 2000-13620 and 2005-64841 do not mention a monochrome mode, and do not disclose the adjustment of color tone in a monochrome image. Japanese Patent Laid-Open Nos. 2000-13620 and 2005-64841 do not mention the adjustment of monochrome color tone between recording media having different color tones of paper white.

SUMMARY OF THE INVENTION

The present invention provides a technique for obtaining a high-quality monochrome image, regardless of the color tone of paper white of a recording medium onto which the monochrome image is recorded, with a reduced influence of paper white of the recording medium.

The present invention provides an image forming apparatus including a recording medium selecting unit configured to select a recording medium on which an image is to be formed from among a plurality of recording media having unique color tones; a mode setting unit configured to set whether the image is to be output in a monochrome mode; a signal converting unit configured to convert a luminance signal corresponding to the image into a density signal when the monochrome mode is set in the mode setting unit; and a forming unit configured to form an image on the recording medium selected by the recording medium selecting unit according to the density signal, wherein the signal converting unit is controlled so that a color tone of an intermediate-density portion of the image formed on the recording medium is set to be near a*=A in the a*b* plane of the CIE-L*a*b* space, where A is a constant.

According to the present invention, regardless of the color tone unique to a recording medium onto which an image is formed in a monochrome mode, a high-quality monochrome image can be obtained with a reduced influence of the color tone unique to the recording medium.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Image processing according to exemplary embodiments of the present invention will now be described in detail with reference to the drawings.

Figure 1:
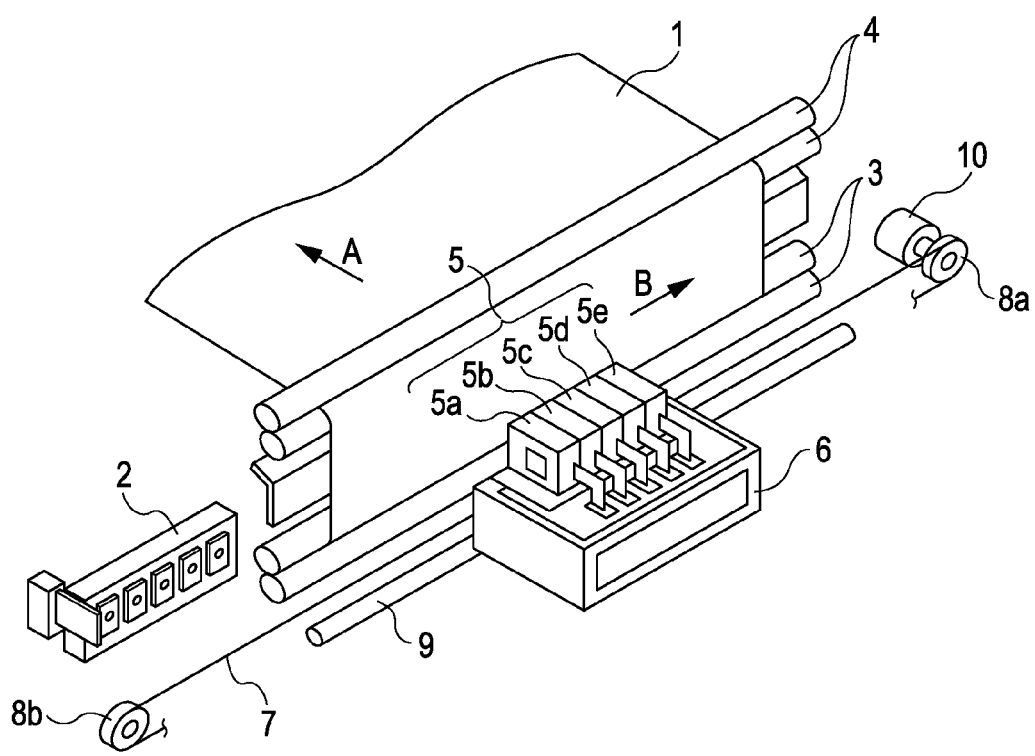
FIG. 1 is a diagram showing an internal structure of an inkjet recording apparatus according to a first embodiment of the present invention.

FIG. 1 shows an internal structure of an inkjet recording apparatus according to an exemplary embodiment of the present invention. A recording medium 1 is a recording medium such as a sheet of paper or a plastic sheet. Before recording, a plurality of recording media 1 are stacked on a cassette (not shown) or the like. When the recording operation is started, the plurality of recording media 1 are fed one-by-one by a feed roller (not shown) into a main body of the recording apparatus. A first conveying roller pair 3 and a second conveying roller pair 4 are arranged at predetermined intervals in the manner shown in FIG. 1. The first conveying roller pair 3 and the second conveying roller pair 4 are driven by different stepping motors (not shown) to convey the recording medium 1 held between the first conveying roller pair 3 and between the second conveying roller pair 4 a predetermined amount in the direction indicated by an arrow A.

An ink tank 5 including ink tank portions 5a to 5e is an ink tank for supplying ink to an inkjet recording head 11 (not shown in FIG. 1). The ink tank portions 5a, 5b, 5c, 5d, and 5e accommodate black (hereinafter referred to as "K"), gray (hereinafter referred to as "Gr"), C, M, and Y ink colors, respectively. The recording head 11 is placed so that a surface of discharge ports of the recording head 11 from which ink droplets are discharged faces the recording medium 1 held between the first conveying roller pair 3 and between the second conveying roller pair 4 so as to be tensioned to some extent. The recording head 11 may be configured such that portions of the recording head 11 from which a total of five ink colors are discharged are separately formed or are integrated in a single unit.

The recording head 11 and the ink tank 5 can be detachably mounted on a carriage 6. The carriage 6 is driven by a carriage motor 10 through two pulleys 8a and 8b and a belt 7 to reciprocate in the direction indicated by an arrow B. The scanning direction of the carriage 6 is guided by a guide shaft 9.

A recovery device 2 is a recovery device used for maintenance of the recording head 11. The recording head 11 moves to a home position at which the recovery device 2 is located, as necessary, and the recovery device 2 performs a recovery operation to remove ink clogs in the discharge ports of the recording head 11.

In the recording operation, the carriage 6 moves at a predetermined speed in the direction indicated by the arrow B, and ink droplets are discharged from the recording head 11 at appropriate timings according to an image signal. When the recording head 11 finishes one recording scanning operation, the first and second conveying roller pairs 3 and 4 allow the recording medium 1 to move a predetermined amount. In this way, the recording scanning operation and the movement of the recording medium are alternately performed to sequentially form an image on the recording medium 1.

Figure 2:
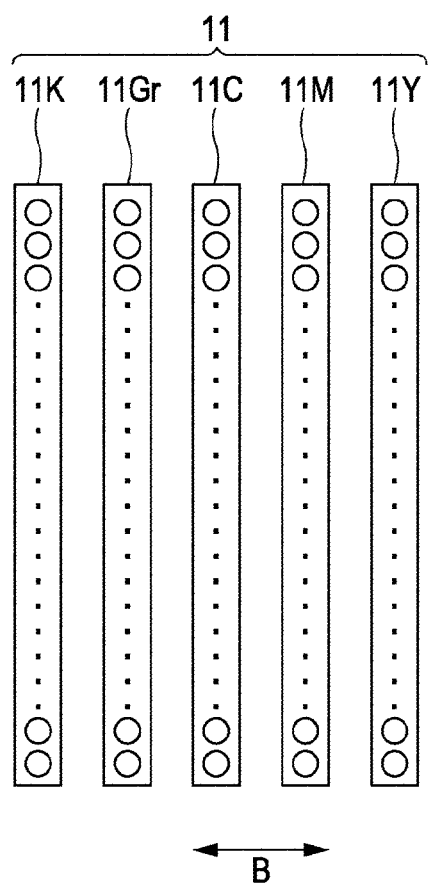
FIG. 2 is a diagram showing the arrangement of discharge ports of a recording head of the inkjet recording apparatus.

FIG. 2 is a diagram showing an arrangement of the discharge ports of the recording head 11. As shown in FIG. 2, the discharge ports for the individual ink colors are arranged in an order similar to that of the ink tank portions 5a to 5e in the direction indicated by the arrow B corresponding to the scanning direction of the carriage 6. The recording head 11 includes 512 discharge ports for each color arranged at a pitch of about 40 μm in the direction indicated by the arrow A corresponding to the carrying direction of the recording medium 1. Therefore, the recording head 11 performs one recording scanning operation to form an image with a resolution of 600 dots per inch (dpi), which is a reference value, on the recording medium 1.

Figure 3:
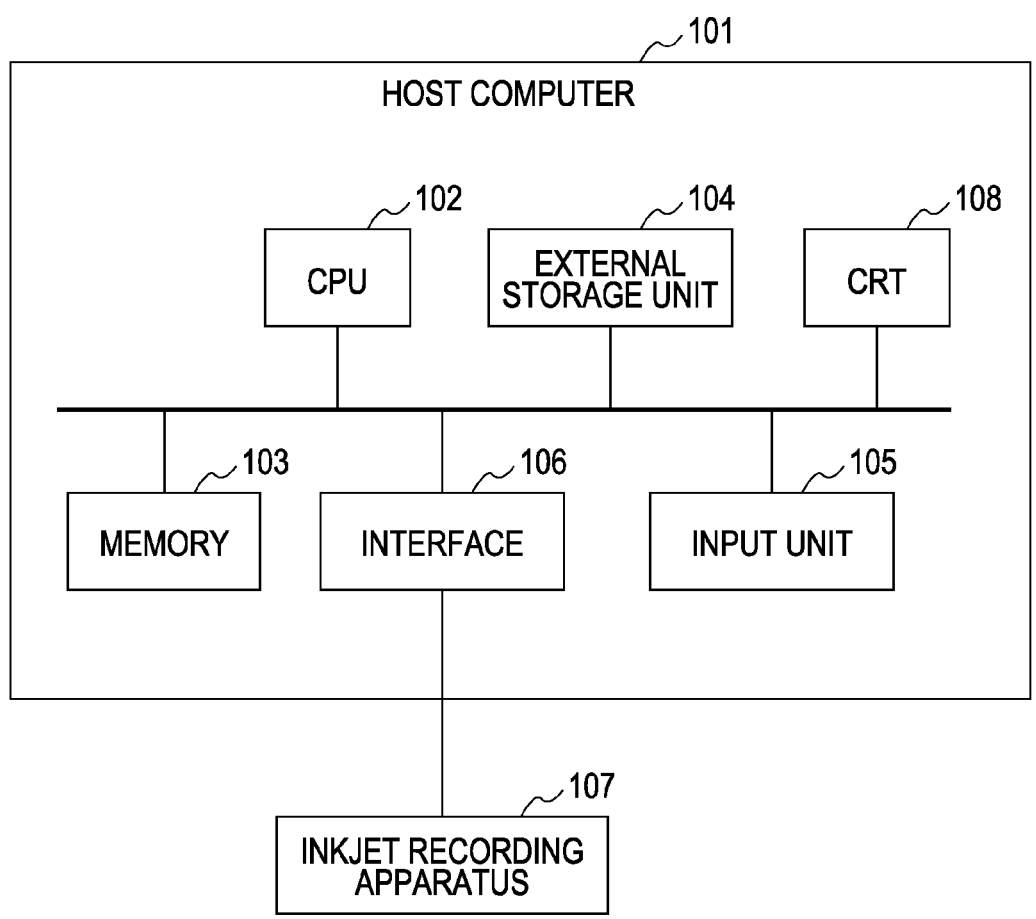
FIG. 3 is a block diagram of an image processing system according to the first embodiment.

FIG. 3 is a block diagram showing an image processing system according to the present embodiment. A host computer 101 includes a central processing unit (CPU) 102, a memory 103, an external storage unit 104, an input unit 105, a cathode-ray tube (CRT) 108, and an interface 106.

The CPU 102 executes a program stored in the external storage unit 104 to perform conversion of various types of image data, described below, and the overall process relating to the recording operation. The memory 103 is used as a work area in the conversion process, or is used as a temporary storage region of the image data. The program for executing the conversion of the image data, etc., may be supplied from an external apparatus (not shown) or the like to the host computer 101. A user inputs various commands using the input unit 105 while viewing the CRT 108.

The host computer 101 is connected to an inkjet recording apparatus 107 through the interface 106. Under the control of the CPU 102, the converted image data is transmitted to the inkjet recording apparatus 107 for recording.

Figure 4:
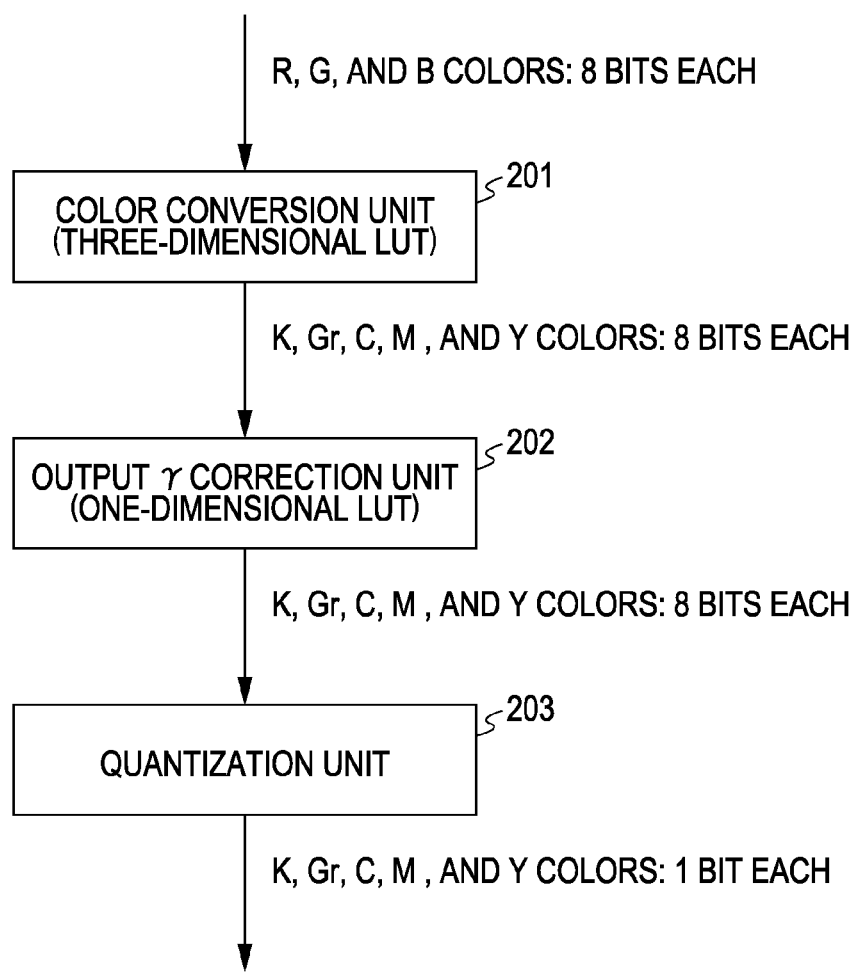
FIG. 4 is a block diagram showing steps of an image data conversion process.

FIG. 4 is a block diagram showing the steps of the image data conversion process performed by the CPU 102 according to the present embodiment. In the present embodiment, 8-bit (i.e., 256-level) image data represented by red (R), green (G), and blue (B) luminance signals is finally converted into 1-bit C, M, Y, K, and Gr data in the form that can be recorded by the inkjet recording apparatus 107.

The 8-bit R, G, and B luminance signals are first input to a color conversion unit 201 and are converted into C, M, Y, K, and Gr density signals. This conversion process is performed using a three-dimensional color conversion look-up table (LUT). Specifically, the CPU 102 refers to the look-up table to determine C, M, Y, K, and Gr density signal values corresponding to the input set of R, G, and B signal values. The look-up table has only density data associated with specific discrete sets of R, G, and B data, and is not applied directly to all possible sets of R, G, and B data represented by 256 levels for each color. In the present embodiment, density signal values for input data in the portion that is not stored in the look-up table are determined by performing an interpolation process using the plurality of data stored in the look-up table. The interpolation process is known in the art and a detailed description thereof is thus omitted. The density signal values output from the color conversion unit 201 are expressed in 8 bits like the input values, and represent density data having gradation values of 256 levels.

The image data subjected to the color conversion by the color conversion unit 201 is further subjected to conversion by an output gamma (γ) correction unit 202. The output γ correction unit 202 performs correction for each of the ink colors so that the optical density finally represented on the recording medium 1 can be maintained linearly with respect to the input density signals. This conversion is performed by referring to a one-dimensional look-up table independent for each color, and the output signals from the output γ correction unit 202 are density data expressed in 8 bits as in the input values.

The 8-bit density data output from the output γ correction unit 202 is supplied to a quantization unit 203 for quantization. In the inkjet recording apparatus 107 according to the present embodiment, an ink droplet of 3 ng is discharged from the recording head 11. Thus, the color density at each recording pixel of the recording medium 1 is represented by two levels, i.e., whether or not each ink droplet is to be recorded, according to the ink type used. When an area having a certain size including a plurality of recording pixels is viewed macroscopically, the color density for that area is represented according to the number of recording pixels in which ink droplets are recorded. This color density representation is generally referred to as an area ratio gray-scale method. A recording apparatus using the area ratio gray-scale method requires a quantization process to convert multivalued data into binary data, as in the present embodiment. There are several quantization techniques, and a known technique such as error diffusion or dithering can be used. The 1-bit image data for each color obtained through the quantization process by the quantization unit 203 is transferred to the inkjet recording apparatus 107.

The conversion method optimum for the color conversion unit 201, the output γ correction unit 202, and the quantization unit 203 depends on the type of the recording medium, the type of the image to be recorded, etc. In particular, the look-up tables used in the color conversion unit 201 and the output γ correction unit 202 are typically provided for each type of recording medium.

Figure 5:
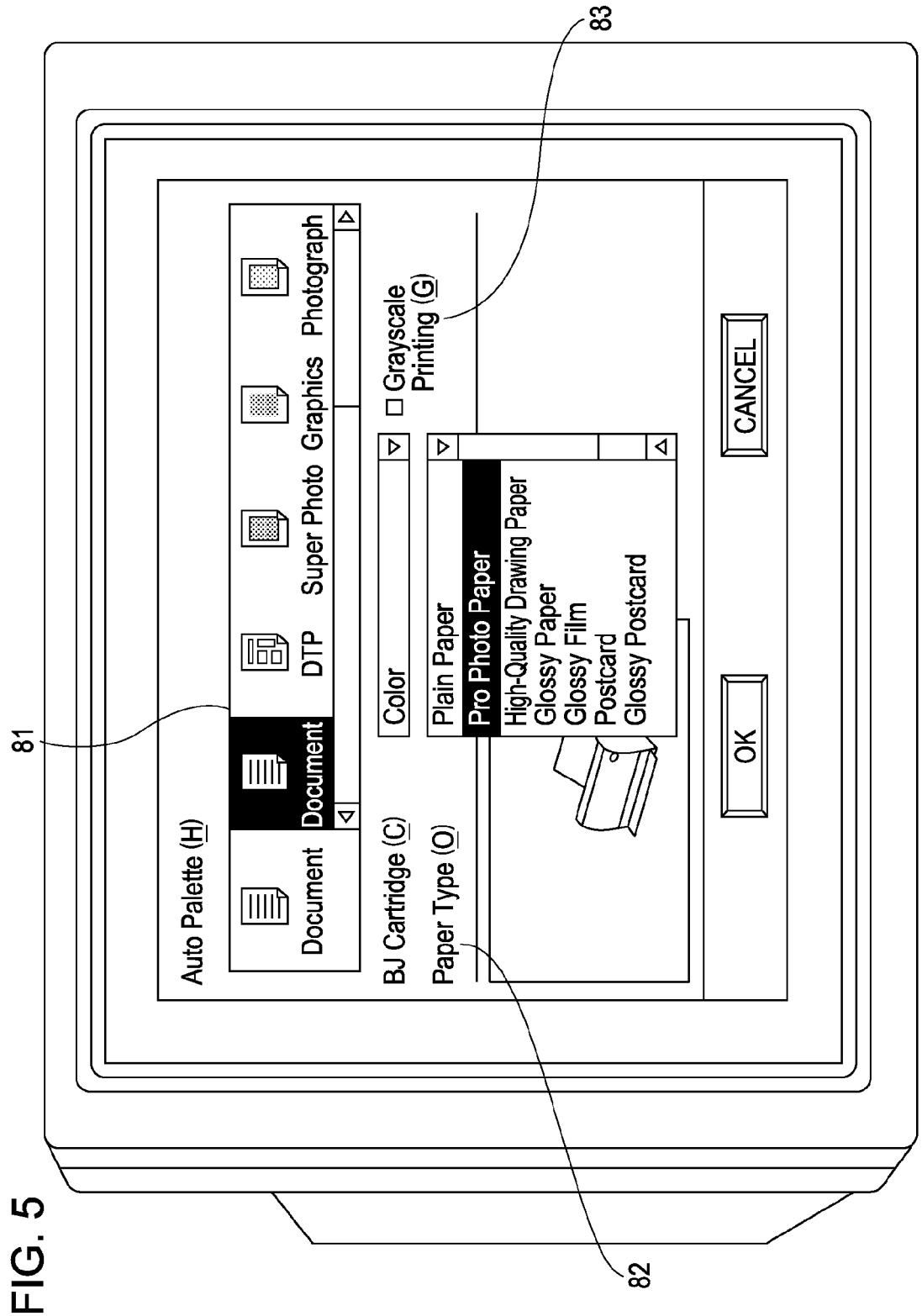
FIG. 5 is a diagram showing an example screen displayed on a CRT for setting a recording mode.

FIG. 5 shows an example screen displayed on the CRT 108 for setting a recording mode. A typical inkjet recording apparatus can record images on a plurality of types of recording media, and a recording method suitable for each of the recording media is used. The recording methods can be changed by setting the recording mode. In many cases, the recording mode is set by the user by entering several conditions through the screen shown in FIG. 5. In the present embodiment, the user specifies the type of an image to be recorded (a document, photograph, etc.) using an auto palette 81. In a "paper type" field 82, the user specifies the type of a recording medium on which the image is to be recorded. Further, the user checks a grayscale printing checkbox 83 to record the desired image in grayscale, or set a monochrome mode.

If the monochrome mode is set, the color conversion unit 201 discards RGB color information represented by input signal values. That is, the R, G, and B image signals are converted into a gray-tone luminance signal (i.e., R=G=B). If an achromatic-color luminance signal value to be determined is represented by L, the conversion process is performed using, for example, the conversion equation below to replace all the R, G, and B image signals with the luminance signal value L:

$$L=0.3R+0.6G+0.1B \tag{1}$$

If the monochrome mode is set, a look-up table different from that for the color mode is set in the color conversion unit 201 and a gray image with color tones suitable as a monochrome photograph is output.

Figure 6:
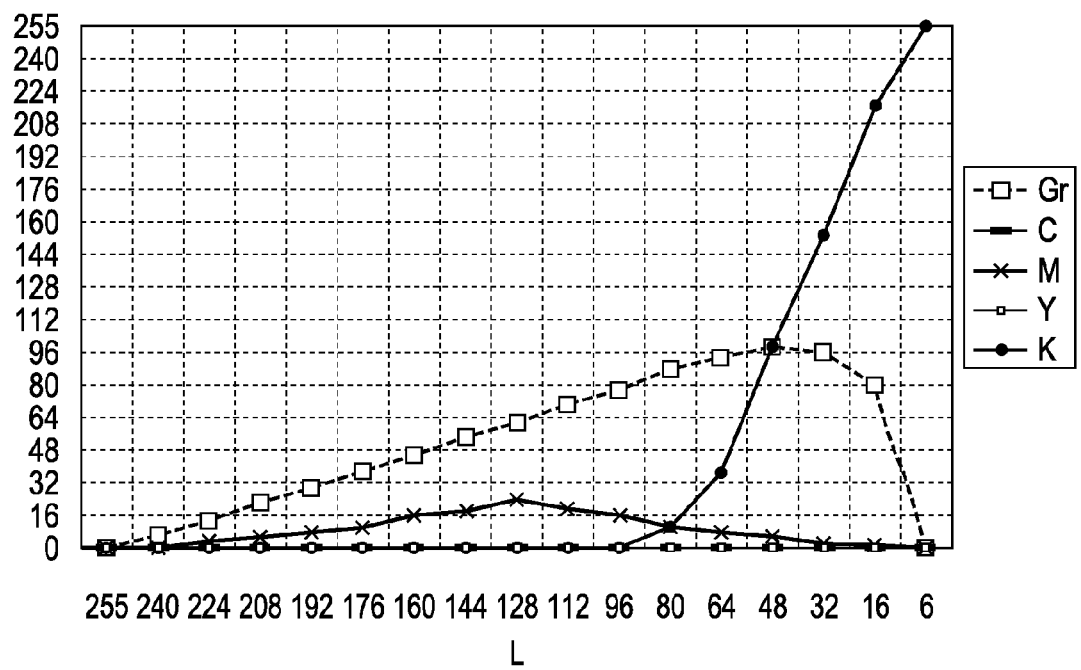
FIG. 6 is a graph showing an example look-up table in a color conversion process.

FIG. 6 shows an example look-up table of the color conversion unit 201 in the monochrome mode.

In FIG. 6, the input luminance signal values of 256 levels from white to black, i.e., 8 bits, are represented on the abscissa axis, and the 8-bit output ink signal values are represented on the ordinate axis. As can be seen from FIG. 6, achromatic inks, i.e., Gr and K inks, are primarily used over all gray levels, and a small amount of two color inks among C, M, and Y colors (in FIG. 6, C and M inks) are also used. In a monochrome photograph, a small change in color tone, or so-called "color shift", is not desired. To reduce such undesired color shift, the above-described use of ink colors is applied to minimize the amount of color inks used to cause a change in color tone, such as C, M, and Y inks. The quantity (or ratio) of those color inks is changed to control the color tone of an output monochrome image.

The control of color tone to produce an output monochrome image with good color tones will now be described.

Figure 7:
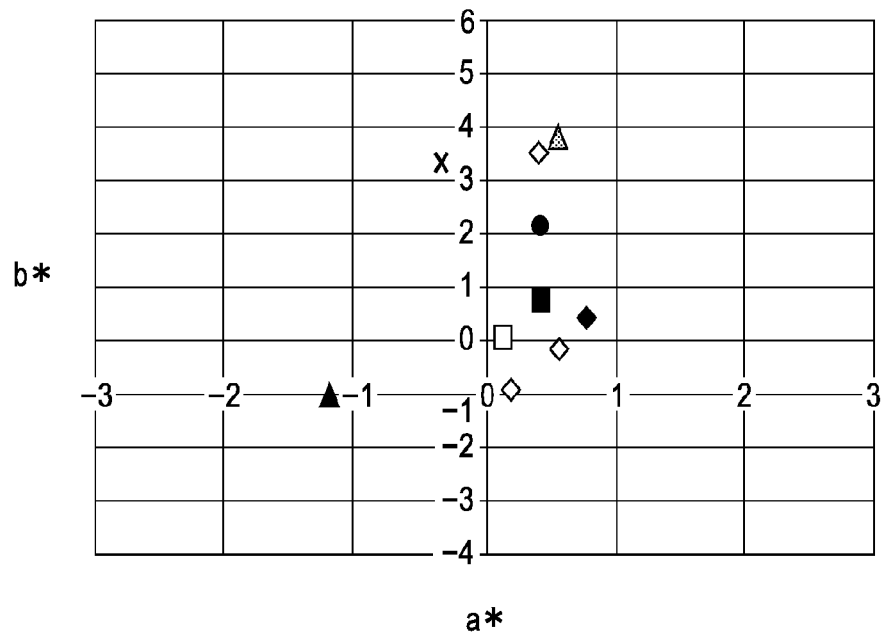
FIG. 7 is a diagram showing color tones in an intermediate-density portion of various types of printing paper used for monochrome silver-halide photographs.

FIG. 7 is a diagram in which color tones in an intermediate-density portion (near $L^*=50$ in the CIE-$L^*a^*b^*$ space) of various types of printing paper used for monochrome silver-halide photographs are plotted in the $a^*b^*$ plane of the CIE-$L^*a^*b^*$ space. Referring to FIG. 7, the color tones in the intermediate-density portion of various types of printing paper used for monochrome silver-halide photographs are located in a region substantially between $a^*=0$ and $a^*=1$ although minor exceptions are found. The color tones of the intermediate-density portion near $L^*=50$ are plotted because the density portion near $L^*=50$ among all monochrome tones from white to black gives a strong visual expression. Specifically, the portion near $L^*=50$ is a range from $L^*=40$ to $L^*=60$. Based on this data, the inventors conducted a panel testing with professional photographers who create many works of monochrome photographs, and found that the color tones matching the color tones of the various types of monochrome silver-halide printing paper are preferred to produce high-quality monochrome photographs. Consequently, the color tone of a monochrome photograph is set to an intermediate value between $a^*=0$ and $a^*=1$, i.e., $a^*=0.5$, to obtain a high-quality monochrome photographic image. In the case where monochrome photographic images are printed on recording media having different color tones of paper white, it was found that the look-up table of the color conversion unit 201 is controlled so that the measurement values of the printed monochrome photographic images can be set to $a^*=0.5$, thus obtaining high-quality monochrome photographic images.

From the result of the above-described panel testing with the professional photographers, as in the above-described variations in the color tone of monochrome silver-halide printing paper, the b* value also varies according to preferences of the professional photographers. That is, some professional photographers prefer warm colors represented by positive b* values, or the so-called warm tone, or, conversely, cold colors represented by negative b* values, or the so-called cool tone, and other professional photographers prefer intermediate colors, or the so-called neutral tone. The term "warm color" means a color having a warm impression, including red, yellow, and orange, and the term "cold color" means a color having a cold impression, including blue. For glossy recording media, the neutral tone with near b*=−1.5 is popular.

If a reference glossy recording medium M0 is set to be a predetermined value such as b*=−1.5, the adjustment of the b* values of other recording media having color tone of paper white different from that of the recording medium M0 will now be described. It is assumed that the b* value of the color tone of paper white of the reference recording medium M0 is represented by bM0 and the b* value of the gray tone of the recording medium M0 is set to be a value b0 according to the preferences of the professional photographers. The recording medium M0 is professional photographic paper with paper white (a*, b*)=(0.0, −4.5). An intermediate density (a*, b*)= (0.5, −1.5) is desirable for recording on professional photographic paper.

If the b* value of the color tone of paper white of another recording medium Mn is presented by bMn, the b* value bn of the gray tone of the recording medium Mn is determined by the following equation:

$$bn = b0 + B(bMn - bM0) \quad (2)$$

In the above equation, if B=0, the b* value bn is equal to the b* value b0, that is, the b* value does not change regardless of the tone of paper white. If B=1, the gray tone changes the same amount as that for the change in paper white. Therefore, desirably, the coefficient B has a value between 0 and 1. The inventors conducted further research on a more optimal value of the coefficient B using an actually printed image. As a result, it was found that the value of the coefficient B is from 0.1 to 0.5, and preferably, the value of the coefficient B is approximately 0.3, to minimize the difference in color tone between recording media having different color tones of paper white.

Figures 8, 9:
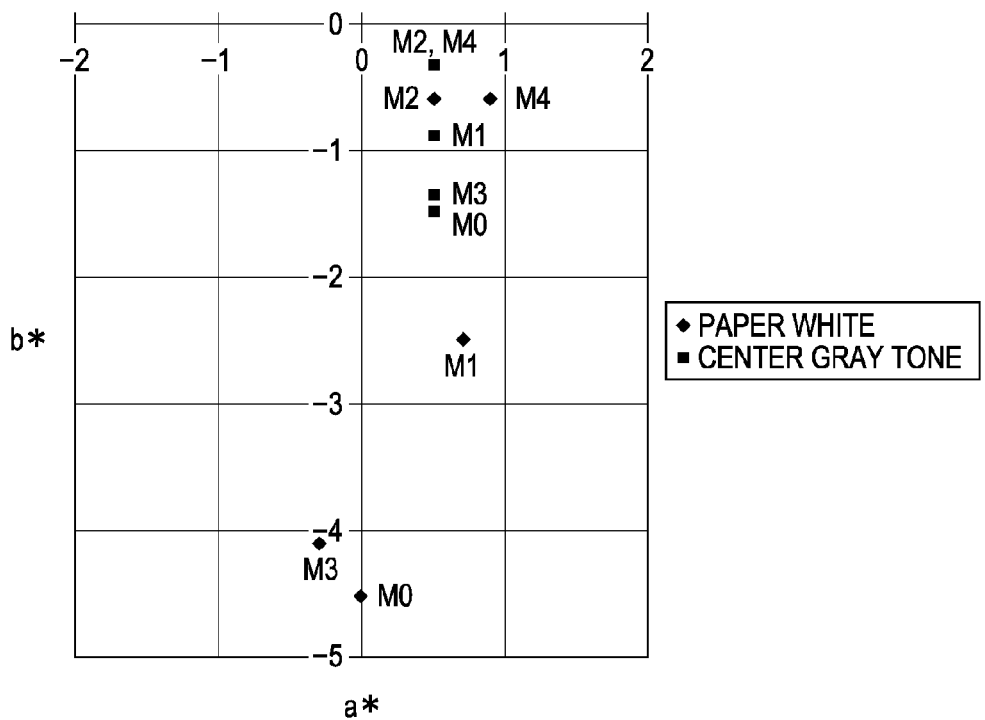
FIG. 8 is a diagram showing the color tone of paper white and the color tone to be set as a gray color tone of various recording media.
FIG. 9 is a diagram showing coordinate values of a chromaticity point for the recording media in the a*b* plane.

FIG. 8 is a diagram showing color tones reproduced using the above-described method by controlling the look-up table of the color conversion unit 201 so that the measurement value of the gray tone after printing is set to be a*=0.5. The process given by Eq. (2) is incorporated in the look-up table of the color conversion unit 201. FIG. 8 shows the a*b* plane of the CIE-L*a*b* space, in which the color tones of paper white of five different recording media M0, M1, M2, M3, and M4 and the center gray tones of images formed as monochrome images on the recording media M0, M1, M2, M3, and M4 are plotted. FIG. 9 shows coordinate values of a chromaticity point for the recording media M0 to M4. The term "center gray tone" means a color tone of an intermediate-tone region that gives a particularly strong visual expression (near L*=50 in the CIE-L*a*b* space).

As can be seen from FIGS. 8 and 9, the look-up tables of the color conversion unit 201 for recording media having different color tones of paper white are controlled so that the center gray tones of the recording media have a constant value a*=0.5 in the a*b* plane of the CIE-L*a*b* space.

Alternatively, an intermediate density may be recorded on the individual recording media, and look-up tables for the individual recording media generated so that the a*b* values calculated from the intermediate density measured using a calorimeter mach the a*b* values of the center gray tone shown in FIG. 9 may be stored in the memory 103 in advance. In this case, a look-up table optimum for representation of the gray tone is selected by the color conversion unit 201 according to the paper type selected on the user interface (UI) shown in FIG. 5.

As described above, according to the first embodiment, even if a monochrome image is formed on various types of recording media having a different color tone of paper white, an unnatural difference in monochrome color tone between recording media can be eliminated or reduced, and a high-quality monochrome color tone can be obtained. Therefore, both desires for outputting a recorded monochrome photograph with good color tones and for outputting a monochrome photograph on recording media having different color tones of paper white can be satisfied.

In the present embodiment, C, M, and Y colorants are used as chromatic colorants by way of example. However, the chromatic colorants that can be used in practice are not limited thereto, and may include, for example, chromatic colorants such as light cyan (LC) and light magenta (LM), and primary chromatic colorants such as red (R), green (G), and blue (B) colorants. Any chromatic colorant that allows tone adjustment for an achromatic colorant can be used in the present embodiment.

In the present embodiment, K and Gr inks are used achromatic inks used in the monochrome mode. However, the colors and combination of achromatic inks are not limited to those described above. Only K color may be used, or two or more Gr inks having different density levels may be used.

In the present embodiment, chromatic colorants for tone adjustment are recorded over all density regions by way of example. However, the practical recording is not limited to this embodiment. For example, chromatic colorants for tone adjustment may be recorded only in a low-density region, and may not be recorded in a high-density region. Further, different inks may be used depending on the color density. For example, in a low-density region, chromatic colorants may be deposited as small dots or light colorants such as LC and LM colorants may be used to perform tone adjustment. In a high-density region, similar colors may be deposited as large dots or dark ink may be used.

While the above-described embodiment has been described in the context of the inkjet recording system having the structure shown in FIG. 1, the present invention is not limited to this embodiment. For example, various color recording systems such as an electrophotographic recording system and a dye-sublimation recording system may be used.

The components shown in FIG. 3 may be incorporated in either a host computer or an inkjet recording apparatus, or all the components may be combined into a single image forming system.

In the above-described embodiment, all the steps of the conversion process shown in FIG. 4 are performed by the CPU 102 of the host computer 101. For example, a portion of or the entirety of the steps of the conversion process may be performed by the inkjet recording apparatus 107. Further, the recording-mode inputting and setting operation described with reference to FIG. 5 may be performed by the inkjet recording apparatus 107.

Furthermore, the recording-mode setting screen described with reference to FIG. 5 is not limited to that described herein. In FIG. 5, the checkbox 83 is provided for selecting grayscale printing. For example, the user can specify the hue and saturation of an output image on the screen, and it may be determined that a grayscale mode has been set when a predetermined hue and saturation are specified.

A system or an apparatus with a storage medium (recording medium) having recorded thereon software implementing the functions of the embodiment described above and executing the software by a computer (a CPU or a micro-processing unit (MPU)) of the system or apparatus may be provided. In this case, the software read from the storage medium implements the functions of the embodiment described above.

As well as achieving the functions of the embodiment described above by executing the software, an operating system (OS) or the like running on the computer may execute part of or the entirety of actual processing according to the instruction of the software to achieve the functions of the embodiment described above.

The software may be stored in a memory of a function extension card or unit connected to the computer, and a CPU or the like of the card or unit may execute part of or the entirety of the actual processing according to the instruction of the software to achieve the functions of the embodiment described above.

In the case where the present invention is applied to the above-described storage medium, the storage medium stores software corresponding to the flowchart described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-233776 filed Aug. 30, 2006, which is hereby incorporated by reference herein in its entirety.

What is claimed is:

1. An image processing apparatus comprising:
a recording medium selecting unit configured to select a recording medium from among a plurality of recording media each having a unique color tone;
a signal converting unit configured to convert a luminance signal corresponding to an image into a density signal using a look-up table depending on a type of the recording medium selected by the recording medium selecting unit in a case where a monochrome output is instructed; and
wherein the look-up table used in the signal converting unit is generated such that an image is formed on a plurality of recording media and that a measurement value of an intermediate-density portion of the formed image on the plurality of recording media is near $a^*=A$ in an $a^*b^*$ plane of the CIE-$L^*a^*b^*$ space, the A being constant.

2. The image processing apparatus according to claim 1, wherein the constant A is approximately 0.5.

3. The image processing apparatus according to claim 1, wherein the look-up table used by the signal converting unit is generated so that a $b^*$ value which is the measurement value of the intermediate-density portion of the image formed on the selected recording medium is set around $b^*=b0+B(bMn-bM0)$ in the $a^*b^*$ plane of the CIE-$L^*a^*b^*$ space, where B and b0 are constants, bM0 is the $b^*$ value of paper white of the reference recording medium, and bMn is the $b^*$ value of paper white of the selected recording medium.

4. The image processing apparatus according to claim 3, wherein the constant B is a value between 0.1 and 0.5, inclusive.

5. The image processing apparatus according to claim 3, wherein the constant B is approximately 0.3.

6. The image processing apparatus according to claim 3, wherein the constant b0 is approximately −1.5.

7. The image processing apparatus according to claim 1, wherein the intermediate-density portion is set so that an $L^*$ value in the CIE-$L^*a^*b^*$ space is approximately 50.

8. An image processing method comprising:
selecting a recording medium from among a plurality of recording media each having a unique color tone;
converting a luminance signal corresponding to an image into a density signal using a look-up table depending on a type of the recording medium selected by the recording medium selecting unit in a case where a monochrome output is instructed; and
wherein the look-up table is generated such that an image is formed on a plurality of recording media and that a measurement value of an intermediate-density portion of the formed image on the plurality of recording media is near $a^*=A$ in an $a^*b^*$ plane of the CIE-$L^*a^*b^*$ space, the A being constant.

9. The image processing method according to claim 8, wherein the constant A is approximately 0.5.

10. The image processing method according to claim 8, wherein the look-up table is generated so that a $b^*$ value which is the measurement value of the intermediate-density portion of the image formed on the selected recording medium is set around $b^*=b0+B$ (bMn−bM0) in the $a^*b^*$ plane of the CIE-$L^*a^*b^*$ space, where B and b0 are constants, bM0 is the $b^*$ value of paper white of the reference recording medium, and bMn is the $b^*$ value of paper white of the selected recording medium.

11. The image processing method according to claim 10, wherein the constant B is a value between 0.1 and 0.5, inclusive.

12. The image processing method according to claim 10, wherein the constant B is approximately 0.3.

13. The image processing method according to claim 10, wherein the constant b0 is approximately −1.5.

14. The image processing method according to claim 8, wherein the intermediate-density portion is set so that an $L^*$ value in the CIE-$L^*a^*b^*$ space is approximately 50.

15. A computer-readable non-transitory recording medium storing a program for allowing a computer to execute an image processing method in an image processing apparatus, the image processing method comprising:
selecting a recording medium from among a plurality of recording media each having a unique color tone;
converting a luminance signal corresponding to an image into a density signal using a look-up table depending on a type of the recording medium selected by the recording medium selecting unit in a case where a monochrome output is instructed; and
wherein the look-up table is generated such that an image is formed on a plurality of recording media and that a measurement value of an intermediate-density portion of the formed image on the plurality of recording media is near $a^*=A$ in an $a^*b^*$ plane of the CIE-$L^*a^*b^*$ space, the A being constant.

16. A program stored in a computer-readable non-transitory storage medium, allowing a computer to execute an image processing method in an image processing apparatus, the control program allowing the computer to execute:
a recording medium selecting step of selecting a recording medium from among a plurality of recording media each having a unique color tone;
a signal converting step of converting a luminance signal corresponding to the image into a density signal using a look-up table depending on a type of the recording medium selected by the recording medium selecting unit in a case where a monochrome output is instructed; and wherein the look-up table used in the signal converting step is generated such that an image is formed on a plurality of recording media and that a measurement value of an intermediate-density portion of the formed image on the plurality of recording media is near $a^*=A$ in the $a^*b^*$ plane of the CIE-$L^*a^*b^*$ space, the A being constant.

17. The image processing apparatus according to claim 1, wherein the look-up table used by the signal converting unit is generated such that the measurement value of the intermediate density portion of the image is a $b^*$ value that is determined based on a $b^*$ value of paper white of the selected recording medium and a $b^*$ value of paper white of a reference recording medium.

18. The image processing apparatus according to claim 1, further comprising:
a gamma correction unit configured to perform a gamma correction on the density signal converted by the signal converting unit.

19. The image processing method according to claim 8, wherein the look-up table is generated such that the measurement value of the intermediate density portion of the image is a $b^*$ value that is determined based on a $b^*$ value of paper white of the selected recording medium and a $b^*$ value of paper white of a reference recording medium.

20. The computer-readable recording medium according to claim 15, wherein the look-up table is generated such that the measurement value of the intermediate density portion of the image is a $b^*$ value that is determined based on a $b^*$ value of paper white of the selected recording medium and a $b^*$ value of paper white of a reference recording medium.

21. The program stored in a computer-readable storage medium according to claim 16, wherein the look-up table is generated such that the measurement value of the intermediate density portion of the image is a $b^*$ value that is determined based on a $b^*$ value of paper white of the selected recording medium and a $b^*$ value of paper white of a reference recording medium.

* * * * *